P. F. CAVANAUGH.
FAUCET.
APPLICATION FILED APR. 19, 1906.
907,458.
Patented Dec. 22, 1908.
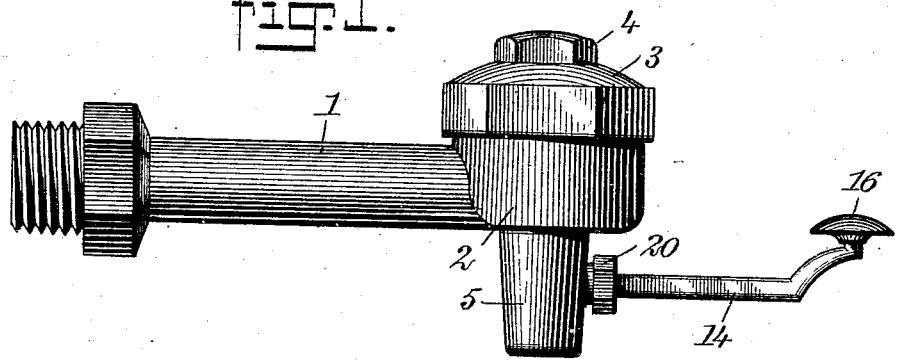
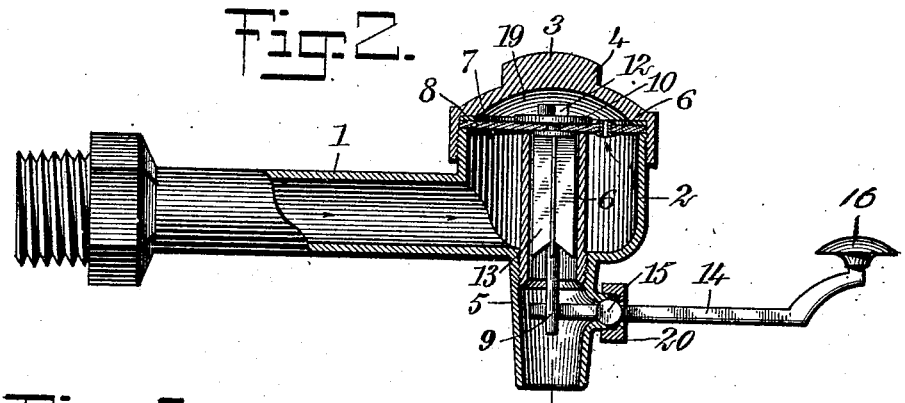
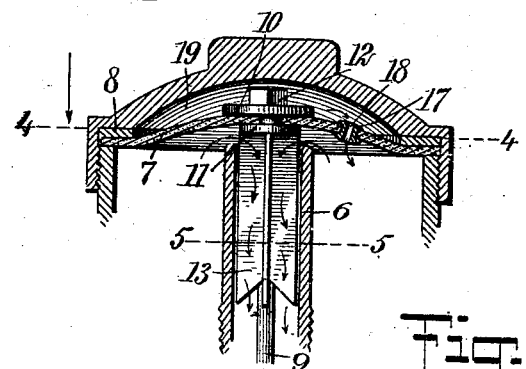
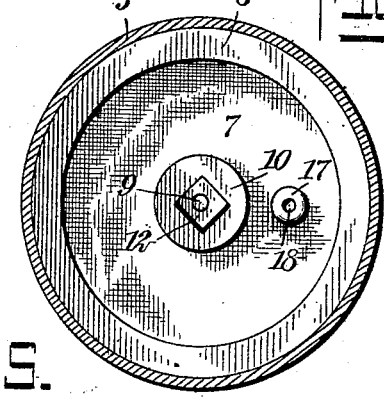
WITNESSES:
INVENTOR
Patrick F. Cavanaugh
BY Munn & Co
ATTORNEYS

UNITED STATES PATENT OFFICE.

PATRICK F. CAVANAUGH, OF LA CROSSE, WISCONSIN.

FAUCET.

No. 907,458. Specification of Letters Patent. Patented Dec. 22, 1908.

Application filed April 19, 1906. Serial No. 312,562.

*To all whom it may concern:*

Be it known that I, PATRICK F. CAVANAUGH, a citizen of the United States, and a resident of La Crosse, in the county of La Crosse and State of Wisconsin, have invented a new and Improved Faucet, of which the following is a full, clear, and exact description.

This invention relates to faucets used for plumbing or other purposes, and is especially useful in connection with faucets which automatically shut off the flow of liquid when released.

The object of the invention is to provide a device of this character which is simple and durable in construction, which will not permit the leakage of water when it is not in use, and which is closed by the pressure of the water.

A further object of the invention is to provide an automatically closing faucet in which no use is made of springs to effect the closing.

The invention consists in the construction and combination of parts to be more fully described hereinafter and definitely set forth in the claims.

Reference is to be had to the accompanying drawings forming a part of this specification, in which similar characters of reference indicate corresponding parts in all the figures.

Figure 1 is a side elevation of my invention; Fig. 2 is a similar view showing the faucet partly in cross section; Fig. 3 is an enlarged vertical section of a portion of the device; Fig. 4 is a horizontal section on the line 4—4 of Fig. 3, and Fig. 5 is a horizontal section on the line 5—5 of Fig. 3.

Referring more particularly to the parts, I provide a tubular section 1 terminating at one end in a threaded extremity and provided with an integral nut to permit its attachment to piping. Formed integrally with the tubular section 1 at the extremity remote from the threaded end, is a body or chamber 2 which is threaded at its upper rim to receive a correspondingly threaded cap 3. The cap 3 is provided with an integral nut 4 to permit its attachment to the chamber 2. The cap 2 is also provided with an inner recess 19, for a purpose to be described hereinafter. Formed integrally with the chamber 2, in the bottom thereof, is a nozzle 5 which projects downwardly, and from which the water flows when the faucet is open. This nozzle 5 is internally threaded to receive a correspondingly threaded tubular body 6, which projects into the chamber 2. I provide between the upper rim of the chamber and a shoulder 6 formed on the cap, a flexible diaphragm 7 of rubber, cloth or heavy duck. Between the diaphragm and the cap is placed a gasket ring 8 of soft metal or other suitable material. It will be understood that the diaphragm is secured in place by the screwing down of the cap upon the diaphragm and the gasket ring.

Within the tube 6 and the nozzle 5 is located a stem 9, which is secured at its upper extremity to the diaphragm 7 by means of washers 10 and 11, and a nut 12 which screws on to the threaded extremity of the stem. Formed integrally with the stem, near the upper portion thereof, are guide blades 13 at right angles to each other, which keep the stem alined centrally within the tube, but freely permit the flow of water through the tube. The nozzle 5 has an opening in which a lever 14 is pivoted on a pin 15. The extremity of the lever 14 projects into the nozzle 5 and engages with the lower portion of the stem 9. The pin 15 is held in place by means of a threaded member 20. The other end of the lever is provided with a button 16, by means of which it may be conveniently depressed in operating the faucet.

The diaphragm 7 is provided with a rivet 17, in which is an opening 18 which permits the water to flow through the diaphragm into the recess 19 of the cap and thus to press upon the diaphragm and force the same against the opening of the tubular body 6. It will be understood that the area of the diaphragm against which the water pressure is exerted on the upper side, is greater than the corresponding area on the under side of the diaphragm; and consequently, the unbalanced pressure will be sufficient to depress the diaphragm against the opening.

When it is desired to open the faucet, the lever 14 is pressed downwardly: this raises the stem 9 and diaphragm 7, the water above the diaphragm and in the recess flowing out through the opening 18. The water then flows through the pipe into the chamber 2 and through the tube 6 between the guide blades 13 and then out through the nozzle 5. To shut off the flow of water, it is merely necessary to release the lever, when the pressure of the water upon the upper side of the diaphragm is sufficient to force the latter against the tube 6 and thus close the same.

In case the water pressure is found insufficient to operate the closing of the faucet, an auxiliary spring can be inserted between the cap 3 and nut 12 to assist in forcing the diaphragm downwardly when the lever is released.

It will be understood that the diaphragm 7, being located between the upper rim of the chamber and the cap, may act as a gasket or packing; and if desired, it is possible to dispense with the extra packing ring 8.

If found desirable in practice, a washer made of hard rubber may be placed between the washer 11 and the diaphragm 7, thereby prolonging the life of the diaphragm when the device is used in connection with a hot water supply.

Having thus described my invention I claim as new and desire to secure by Letters Patent:

1. A faucet, comprising a chamber having a tubular outlet, a flexible diaphragm mounted within said chamber and adapted to close the inner extremity of said outlet, said diaphragm being formed to permit the fluid to pass to the upper side thereof whereby the pressure of the fluid forces the diaphragm into a position against said outlet, a stem secured to said diaphragm and guided within said outlet, and means for manually operating and controlling said stem to raise said diaphragm.

2. A faucet comprising a chamber having a tubular outlet projecting inwardly and outwardly, a flexible diaphragm mounted within said chamber and adapted to close the inner extremity of said outlet, said diaphragm being formed to permit a fluid to pass to the upper side thereof, whereby the pressure of the fluid forces the diaphragm into a position against said outlet, a stem secured to said diaphragm and having lateral guides within said outlet, and a lever adapted to be manually operated and controlling said stem to raise said diaphragm.

3. A faucet presenting a chamber, a cap having an inner recess, a tubular outlet, a flexible diaphragm secured within said chamber and said cap and arranged to close said outlet, said diaphragm being formed to admit a fluid to said recess, whereby the fluid pressure normally holds said diaphragm against said outlet, a stem in said outlet having guides secured to said diaphragm, and a lever pivotally mounted at a side of said outlet, said lever being adapted to be manually operated to raise said stem.

4. A faucet comprising a chamber, an outlet, a tube within said chamber in communication therewith and with said outlet, a cap having a recess, a flexible diaphragm mounted over said recess and adapted to close said tube, said diaphragm having an opening therethrough to permit the entrance of a fluid to said recess, whereby the fluid pressure normally holds said diaphragm against said tube, a stem secured to said diaphragm and having guide blades within said tube, and a lever pivotally mounted at a side of said outlet and adapted to be manually depressed to raise said stem.

In testimony whereof I have signed my name to this specification in the presence of two subscribing witnesses.

PATRICK F. CAVANAUGH.

Witnesses:
   WM. J. SCOTT,
   JOHN CASTLEY.